United States Patent
White et al.

(10) Patent No.: US 6,711,242 B2
(45) Date of Patent: Mar. 23, 2004

(54) TELECOMMUNICATIONS MAILBOX MESSAGING SYSTEM AND METHOD

(75) Inventors: Gail Elizabeth White, Richardson, TX (US); Maria Adamczyk, Alpharetta, GA (US); Navnect Patel, Marietta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 09/742,766

(22) Filed: Dec. 20, 2000

(65) Prior Publication Data

US 2002/0080929 A1 Jun. 27, 2002

(51) Int. Cl.[7] .................................................. H04M 1/64
(52) U.S. Cl. ............................. 379/88.25; 455/412.2; 709/227
(58) Field of Search ........................... 379/88.01, 88.04, 379/88.09, 88.1, 88.13, 88.16, 88.17, 88.18, 88.22, 88.25, 221.02, 114.02; 455/412.2; 709/227

(56) References Cited

U.S. PATENT DOCUMENTS

| | | | |
|---|---|---|---|
| 5,708,699 A | 1/1998 | Concepcion et al. | |
| 5,754,628 A | 5/1998 | Bossi et al. | |
| 5,857,013 A | 1/1999 | Yue et al. | |
| 6,002,750 A | 12/1999 | Ertz | |
| 6,061,432 A * | 5/2000 | Wallace et al. | 379/88.18 |
| 6,069,890 A * | 5/2000 | White et al. | 379/88.17 |
| 6,097,791 A | 8/2000 | Ladd et al. | |
| 6,285,745 B1 * | 9/2001 | Bartholomew et al. | 379/88.17 |
| 6,330,308 B1 * | 12/2001 | Cheston et al. | 379/88.18 |
| 6,330,311 B1 * | 12/2001 | Mijares et al. | 379/114.02 |

OTHER PUBLICATIONS

Hedden, Digital signal route determination method, Aug. 12, 2000.*
Bellcore, Message Transport and Routing Service Technical Service and Architectur Description, May 1993, Special Report SR–INS–002662.*

* cited by examiner

*Primary Examiner*—Fan Tsang
*Assistant Examiner*—Gerald Gauthier
(74) *Attorney, Agent, or Firm*—Kirkpatrick & Lockhart LLP

(57) ABSTRACT

A telecommunications messaging system, including a server, and a first VMS platform in communication with the server, wherein the first VMS platform includes a service region comparison module. According to one embodiment, the first VMS platform is for transmitting a message from the first VMS platform to a second VMS platform in communication with the first VMS platform, and the service region comparison module is for determining whether the first and second VMS platforms service a common service region.

15 Claims, 2 Drawing Sheets

TELECOMMUNICATIONS MAILBOX MESSAGING SYSTEM AND METHOD

CROSS-REFERENCE TO RELATED APPLICATIONS

Not Applicable.

STATEMENT REGARDING FEDERALLY SPONSORED RESEARCH AND DEVELOPMENT

Not Applicable.

BACKGROUND OF INVENTION

1. Field of Invention

The present invention relates generally to communications and, more particularly, to systems and methods for telecommunications mailbox messaging.

2. Description of the Background

Many telecommunications service providers offer voice messaging services for their customers. With a typical voice messaging system (VMS), when an incoming call to a subscriber of the service cannot be completed, such as because of a busy or ring-no answer condition, the caller is connected to a VMS platform that allows the caller to leave a voice message for the subscriber in a "mailbox" associated with the subscriber. The subscriber is then provided with a message waiting indicator (MWI) in the form of a sputter dial tone or a flashing light on the subscriber's telephone alerting the subscriber that the subscriber's voice message mailbox includes a message. The subscriber may then access the mailbox by dialing into the VMS platform to retrieve the message.

Many voice message systems also support mailbox-to-mailbox messaging. With mailbox-to-mailbox messaging, a subscriber may send a message directly from the subscriber's mailbox to the mailbox of another subscriber of the service. In the past, however, mailbox-to-mailbox messaging was limited to the service region boundaries of the service provider. In telecommunications parlance, these service region boundaries are typically referred to as LATAs (Local Access and Transport Areas). LATAs are the geographic regions established by telecommunications service providers to differentiate local and long distance calls. Calls between parties within a LATA (intra-LATA) are typically handled by the local telephone service providers, and calls between parties in different LATAs (inter-LATA) are typically handled by interexchange carriers (IXCs).

In the past, mailbox-to-mailbox messaging has been limited to intra-LATA communications because voice messaging systems do not have the intelligent functionality to recognize inter-LATA communications for billing purposes. That is, if a service provider desired to offer inter-LATA messaging to its VMS subscribers, the service provider could not charge different rates (typically higher) for inter-LATA mailbox-to-mailbox messaging because the VMS system could not recognize inter-LATA communications. As a result, service providers offering inter-LATA mailbox-to-mailbox messaging are compelled to charge the same rate for inter-LATA communications as for intra-LATA communications.

Accordingly, there exists a need for a voice messaging system with the intelligent functionality to recognize inter-LATA mailbox-to-mailbox communications.

SUMMARY OF THE INVENTION

The present invention is directed to a telecommunications messaging system. According to one embodiment, the system includes a server and a first VMS platform in communication with the server, wherein the first VMS platform includes a service region comparison module. The service region comparison module may be provisioned with information concerning the service area, such as the LATA, of the first VMS platform on which it resides, and it may receive information concerning the service area of a second VMS platform from the server in response to a query message from the first VMS platform when the first VMS platform receives a command from a subscriber to transmit a message from its mailbox at the first VMS platform to a recipient having a mailbox at the second VMS platform. Based on this information, the service region comparison module may determine whether inter-service region messaging is required. The service regions may correspond to LATAs. Consequently, in contrast to prior art voice messaging systems, the present invention permits differentiation between inter-LATA messaging and intra-LATA messaging. As a result, voice and/or facsimile messaging service providers may provide different fee treatment for inter-LATA and intra-LATA messages.

According to another embodiment of the present invention, subscribers of the voice messaging service may designate whether they wish to be have inter-LATA messaging capabilities, which typically will have a greater fee to the subscriber than intra-LATA messaging, disabled by the system. According to such an embodiment, when the service region comparison module determines that a subscriber who has disabled inter-LATA messaging has initiated a command to send a message to a recipient having a mailbox at a VMS platform servicing another LATA, the first VMS platform may play a message for the subscriber to the effect that the recipient is in another LATA and that the subscriber has disabled inter-LATA messaging. According to one embodiment, the VMS platform may then provide the subscriber the opportunity to complete the message anyway for a certain fee. In addition, according to another embodiment, the service region comparison module may reside at the server, and transmit messages to the first VMS platform as to whether the recipient VMS platform services the same or a different LATA.

These and other benefits of the present invention will be apparent from the detailed description hereinbelow.

BRIEF DESCRIPTION OF THE FIGURES

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements. For example, certain operating system details and modules of certain of the intelligent platforms of the system are not described herein. Those of ordinary skill in the art will recognize, however, that these and other elements may be desirable in a typical voice messaging system. However, because such elements are well known in the art, and because they do not facilitate a better understanding of the present invention, a discussion of such elements is not provided herein.

Figure 1:
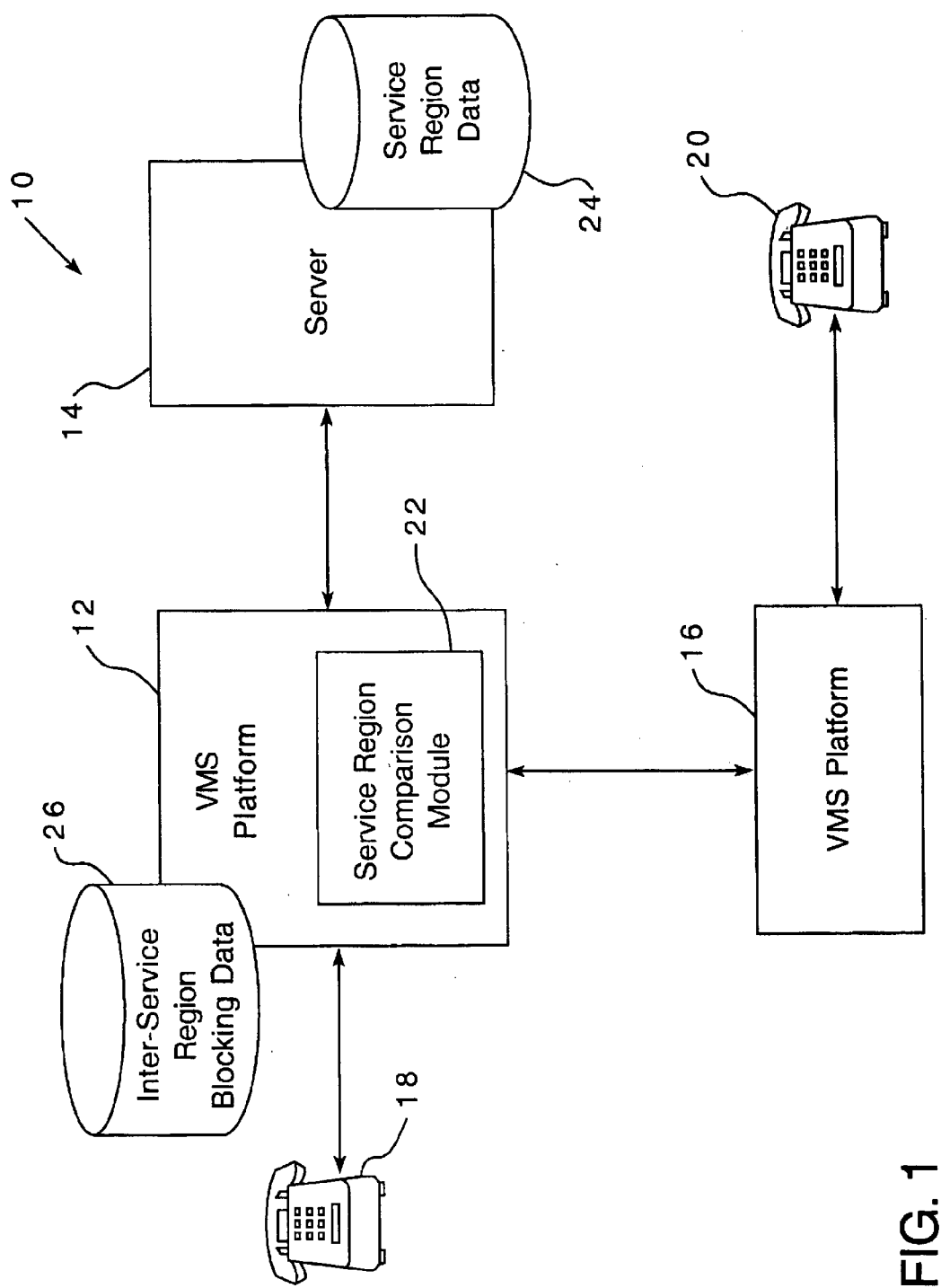
FIG. 1 is a diagram of a voice messaging system according to one embodiment of the present invention.

FIG. 1 is a diagram of a voice messaging system (VMS) 10 according to one embodiment of the present invention. The network 10 includes a first VMS platform 12 in communication with a server 14 and in communication with a second VMS platform 16. The server 14 may be, for example, an intelligent database server such as, for example, an LDAP server. Similarly, the VMS platforms 12, 16 may include intelligent computer processing functionality. The VMS platforms 12, 16 and the server 14 may interface via wireline or wireless communication links using standard signaling protocols such as, for example, the SS7 protocol. According to one embodiment, the VMS platforms 12, 16 may be one of the IMA-CA or Sierra® family of VMS platforms available from the Octel Messaging Division of Lucent Technologies.

The first VMS platform 12 may provide voice and/or facsimile messaging capabilities for a first VMS subscriber, such as a user of the telecommunications device 18, and the second VMS platform 16 may provide voice and/or facsimile messaging capabilities for a second VMS subscriber, such as a user of the telecommunications device 20. According to such an embodiment, each of the VMS platforms 12, 16 may include mailboxes by which subscribers of the voice messaging service, such as users of the telecommunications device 18, 20, may access their voice and/or facsimile messages.

In addition, the VMS 10 may support mailbox-to-mailbox messaging by which a user of the telecommunications device 18 may transmit a voice mail message from a mailbox at the VMS platform 12 associated with the sender to a mailbox at the VMS platform 16 associated with a recipient of the message, such as a user of the telecommunications device 20. According to one embodiment, to initiate a transmission of a message from a sender having a mailbox at the VMS platform 12 to a recipient having a mailbox at the VMS platform 16, the sender (e.g., a user of the telecommunications device 18) may dial a particular feature code or directory number to access the VMS platform 12. The VMS platform 12 may then play a message for the sender prompting the sender, for example, to transmit a message to another subscriber of the voice messaging service (i.e., the recipient). The VMS platform 12 may play the message for the sender using, for example, a text-to-speech (TTS) translation module (not shown) or a recorded audio file (not shown), and may detect the sender's response to the message using, for example, a dual tone multifrequency (DTMF) decoder (not shown) or an automatic speech recognition module (not shown). The message to be sent to the recipient's mailbox may be, for example, an original message, a reply to a message previously sent from the recipient to the sender, or a message from a third party to the sender that the sender is forwarding to the recipient. The message may be, for example, either a voice message or a facsimile message.

When the VMS platform 12 detects the sender's command to transmit a message to the recipient, the VMS platform 12 may query the server 14 as to the VMS platform address for the recipient (e.g., the address of the VMS platform 16). The query message from the VMS platform 12 to the server 14 may be formatted according to, for example, the lightweight directory access protocol (LDAP). After receiving the query message from the VMS platform 12, the server 14 may retrieve the recipient's address and forward it to the VMS platform 12 using, for example, the LDAP format. After receiving the recipient's address, the VMS platform 12 may transmit the message to the recipient's mailbox at the VMS platform 16 using, for example, a TCP/IP format.

The VMS 10 may differentiate between intra-service region mailbox-to-mailbox messaging and inter-service region mailbox-to-mailbox messaging. That is, the VMS 10 may differentiate between mailbox-to-mailbox messaging where the VMS platforms 12, 16 service the same service area of the telecommunications service provider (intra-service region) and mailbox-to-mailbox messaging where the VMS platforms 12, 16 service different service areas (inter-service region). According to one embodiment, the service regions may be geographic regions corresponding to the geographic regions established by telecommunications services providers to differentiate between local and long distance communications, commonly referred to as LATAs (Local Access and Transport Areas).

According to one embodiment, the VMS platform 12 may include a service region comparison module 22. The module 22 may be implemented as software code to be executed by the VMS platform 12 using any type of computer instruction type suitable such as, for example, microcode, and may be stored in, for example, an electrically erasable programmable read only memory (EEPROM), or can be configured into the logic of the VMS platform 12. According to another embodiment, the module 22 may be implemented as software code to be executed by the VMS platform 12 using any suitable computer language such as, for example, Perl, Java, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM. In addition, the server 14 may have an associated database 24 including data regarding the service regions for which the various VMS platforms (such as the platforms 12, 16) of the VMS 10 provide service.

According to such an embodiment, the query from the VMS platform 12 may request, in addition to the mailbox address of the recipient at the VMS platform 16, the service region that the VMS platform 16 services. The server 14 may retrieve these data from the database 24 and forward the data to the VMS platform 12 in the return message to the VMS platform. The service region comparison module 22 may be provisioned with the service region of the VMS platform 12, and compare the service region for the VMS platform 12 with the data received from the server 14 regarding the service region of the VMS platform 16 to determine if the VMS platforms 12, 16 service the same service region or different service regions.

According to another embodiment, the VMS platform 12 may be provisioned with data regarding whether particular voice messaging subscribers having mailboxes at the VMS platform 12 desire to have the capability to transmit inter-service region messages. That data may be stored, for example, in a database 26 associated with the VMS platform 12. Accordingly, if the service comparison module 22 determines that a message from a subscriber/sender is to be sent to a VMS platform servicing a different service region, the VMS platform 12 may check the database 26 to determine whether that particular subscriber/sender has blocked inter-service region messaging. If so, the VMS platform 12 may play a message informing the subscriber/sender to the effect that the recipient is in a different service area and that the subscriber/sender has previously disabled inter-service region messaging. Subscribers may choose to disable inter-service region messaging on, for example, an opt-out or an opt-in basis. If the subscriber opts to disable inter-service region messaging, the database 26 may be provisioned with a blocking flag associated with that particular subscriber indicating that inter-service region messaging has been disabled.

The VMS 10 has been described herein as including two VMS platforms 12, 16, although according to other embodiments the VMS 10 may include a greater number of VMS platforms. Each VMS platform may be in communication with a server 14. One server 14 may be in communication with more than one VMS platform. In addition, other VMS platforms, such as the VMS platform 16, may include service region comparison modules 22 for mailbox-to-mailbox messages initiated by subscribers having mailboxes at these other VMS platforms, such as a user of the telecommunications device 20 for the VMS platform 16.

Figure 2:
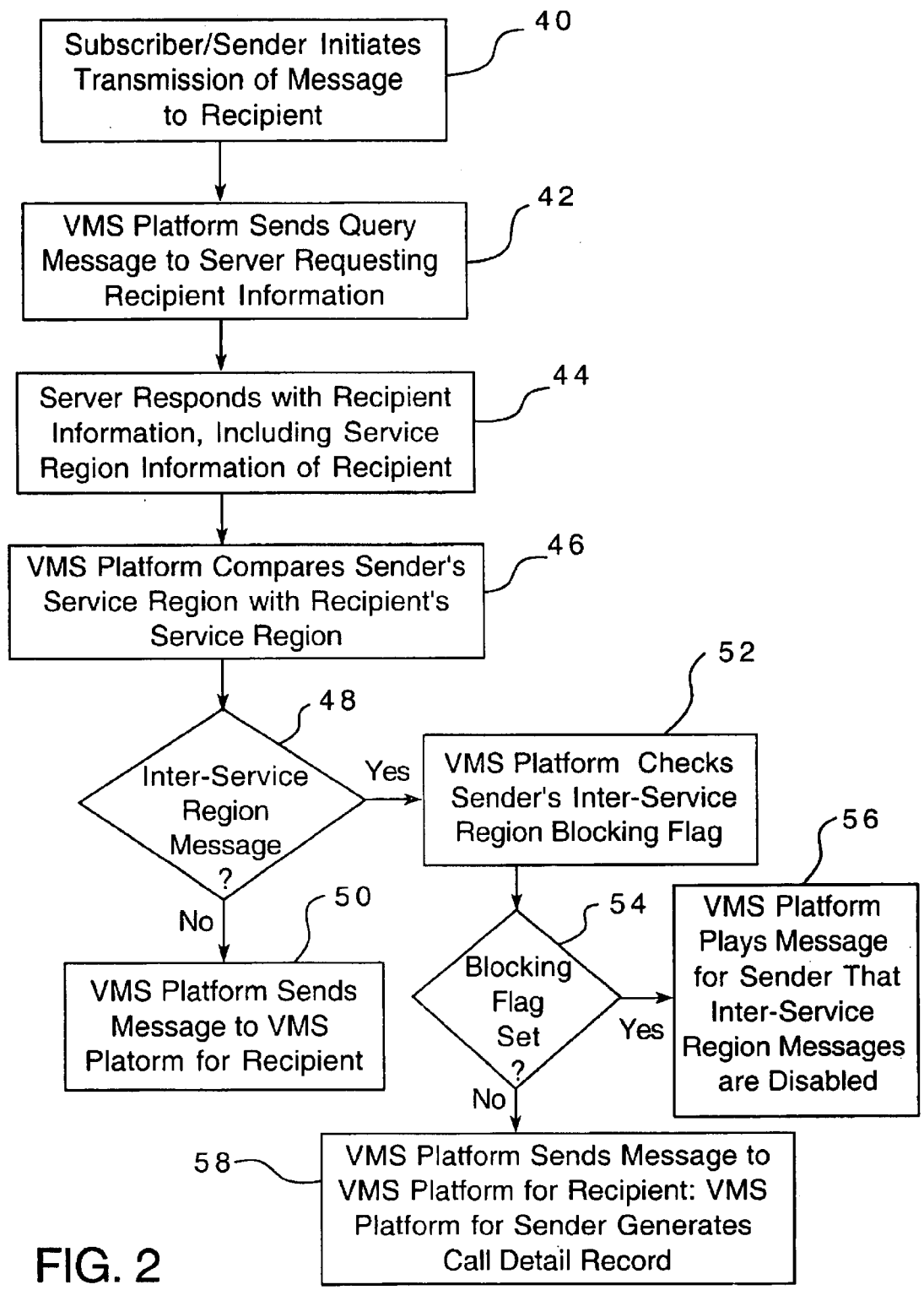
FIG. 2 is a diagram of a process flow through the voice messaging system of FIG. 1 according to one embodiment of the present invention.

FIG. 2 is a block diagram of a process flow through the VMS 10 according to one embodiment. The process initiates at block 40 where a subscriber (sender) of the voice mail messaging service initiates the transmission of a message from the subscriber's mailbox to the mailbox of another subscriber (recipient) of the service. For the purposes of the embodiment described in connection with the process flow of FIG. 2, it is assumed that the sender is a user of the telecommunications device 18 and has a mailbox at the VMS platform 12, and the recipient is a user of the telecommunications device 20 and has a mailbox at the VMS platform 16. The message may be, for example, an original message from the sender to the recipient, a reply to a message previously sent by the recipient to the sender, or the forwarding to the recipient of a message received by the sender from a third party. The message may include, for example, a voice message or a facsimile message.

From block 40 the process advances to block 42 where the VMS platform 12 sends a query message to the server 14 requesting information concerning the recipient. The query message may be formatted, for example, according to the LDAP format and may request the address of the recipient's mailbox at the VMS platform 16 as well as the service area for the VMS platform 16. At block 44, the server 14 may interrogate its databases for this information, including the database 24 for the service region data for the VMS platform 16, and respond with the information to the VMS platform 12 in a return message using, for example, the LDAP format.

From block 44 the process advances to block 46 where the service region comparison module 22 of the VMS platform 12 compares the service region for the VMS platform 12 with the service region for the VMS platform 16 of the recipient. If the service region comparison module 22 determines at block 48 that the VMS platforms 12, 16 do not service different service regions, i.e., the message is an intra-service region message, the process advances to block 50 where the VMS platform 12 sends the message to the mailbox of the recipient at the VMS platform 16. The message may be formatted according to, for example, the TCP/IP protocol.

Conversely, if at block 48 the service region comparison module 22 determines that the service regions for the VMS platforms 12, 16 are different (i.e., the message is an inter-service region message), the process advances to block 52, where the VMS platform 12 interrogates the database 26 to determine if the sender has disabled inter-service region messaging. If the VMS platform determines at block 54 that the inter-service region blocking flag has been set, indicating that the sender has disabled inter-service region messaging, the process advances to block 56 where the VMS platform 56 plays a message for the sender to the effect that the recipient is in a different service area and that the subscriber/sender has previously disabled inter-service region messaging. The VMS platform 12 may play the message using, for example, a TTS translation module or a recorded audio file.

On the other hand, if the VMS platform 12 at block 54 determines that the inter-service region blocking flag has not been set, the process may advance to block 58 where the VMS platform 12 may transmit the message to the VMS platform 16. The message may be sent using, for example, the TCP/IP protocol.

In addition, at block 58 the VMS platform 12 may generate a call detail record (CDR) for the inter-service region mailbox-to-mailbox message. The CDR may include, for example, the originating mailbox number (i.e., the mailbox number for the sender at VMS platform 12), the terminating mailbox number (i.e., the mailbox number for the recipient at VMS platform 16), the date and time the message was sent, and the class of service (COS) (e.g., residential or commercial). The CDR may be used to charge different rates for inter-service messaging than for intra-service messaging. For example, according to one embodiment, a periodic subscription fee may entitle a subscriber to transmit an unlimited number of intra-service region mailbox-to-mailbox messages within a particular time period, and the subscriber may be charged a predetermined flat rate for each inter-service region mailbox-to-mailbox message. According to another embodiment, the subscriber may be charged a predetermined rate per size unit for each inter-service region mailbox-to-mailbox message.

According to another embodiment of the present invention, the service region comparison module 22 may reside with the server 14. According to such an embodiment, the VMS platform 12 may include its service region information in its query message to the server 14 when requesting information regarding the recipient. The server 14 may interrogate the database 24 to determine the service region information regarding the destination VMS platform for the message, and the service region comparison module 22 may determine, based on the data, whether the destination VMS platform services the same service region as the sender's VMS platform or not. This information may be communicated to the VMS platform 12 in the server's return message to the VMS platform 12. If the destination VMS platform services a different service region, the VMS platform 12 may then interrogate the database 26 to determine if the subscriber/sender has disabled inter-service region messaging.

Although the present invention has been described herein with respect to certain embodiments, those of ordinary skill in the art will recognize that many modifications and variations of the present invention may be implemented. For example, with the process flow described hereinbefore in conjunction with FIG. 2, at block 56, rather than playing a message for the subscriber/sender that inter-service region messaging has been disabled, the VMS platform 12 may play a message, for example, prompting the subscriber/sender to inform the VMS platform 12 as to whether the subscriber/sender wishes to transmit the message anyway for a certain fee. If the subscriber/sender informs the VMS platform 12 that it does wish to send the message to the recipient, the VMS platform 12 may transmit the message and generate an appropriate CDR. The foregoing description and the following claims are intended to cover all such modifications and variations.

What is claimed is:

1. A telecommunications messaging system, comprising:
   a server; and
   a first VMS platform in communication with the server, wherein the first VMS platform includes a service region comparison module, wherein:
   the first VMS platform is for sending a LDAP-formatted query to the server for an indication of the service region of a second VMS platform associated with a recipient when the first VMS platform detects an indication by a sender to transmit a message from a mailbox at the first VMS platform associated with the sender to a mailbox at the second VMS platform associated with the recipient;
   the server is for sending a LDAP-formatted response to the query to the first VMS platform including the indication of the service region of the second VMS platform; and
   the service region comparison module is for determining whether the first and second VMS platforms service a common service region.

2. The telecommunication messaging system of claim 1, wherein the first VMS platform is for transmitting the message from the first VMS platform to the second VMS platform.

3. The telecommunications messaging system of claim 2, wherein the service region comparison module is for determining whether the first and second VMS platforms service a common LATA.

4. The telecommunications messaging system of claim 2, wherein the message is selected from the group consisting of a voice message and a facsimile message.

5. The telecommunication messaging system of claim 1, wherein the first VMS platform is further for determining whether the sender of the message has disabled inter-service region messaging when the service region comparison module determines that the first and second VMS platforms service different service regions.

6. A telecommunications messaging system, comprising:
   a first VMS platform;
   a server in communication with the VMS platform;
   a second VMS platform in communication with the first VMS platform; and
   a service region comparison module wherein:
   the first VMS platform is for sending a LDAP-formatted query to the server for an indication of the service region of the second VMS platform associated with a recipient when the first VMS platform detects an indication by a sender to transmit a message from a mailbox at the first VMS platform associated with the sender to a mailbox at the second VMS platform associated with the recipient;
   the server is for sending a LDAP-formatted response to the query to the first VMS platform including the indication of the service region of the second VMS platform; and
   the service region comparison module is for determining whether the first and second VMS platforms service a common service region.

7. The telecommunications messaging system of claim 6, wherein the service region comparison module resides on the first VMS platform.

8. The telecommunications messaging system of claim 6, further comprising means for generating a call detail record when the first and second VMS platforms service different service regions.

9. A telecommunications messaging method, comprising:
   receiving a command to transmit a message from a mailbox at a first VMS platform associated with a sender to a second mailbox at a second VMS platform associated with a recipient;
   sending a LDAP-formatted query for an indication of the service region of the second VMS platform when the command is received;
   receiving a LDAP-formatted response to the query including the indication of the service region of the second VMS platform; and
   determining whether the first and second VMS platforms service a common service region.

10. The method of claim 9, wherein receiving a command to transmit a message includes receiving a command to transmit one of a voice message and a facsimile message from the first VMS platform to the second VMS platform.

11. The method of claim 9, wherein determining includes determining whether the first and second VMS platforms service a common LATA.

12. The method of claim 9, further comprising:
    transmitting the message from the first VMS platform to the second VMS platform when the first and second VMS platforms service the common service region; and
    determining whether inter-service region messaging is enabled for the sender when the first and second VMS platforms service different service regions.

13. The method of claim 12, further comprising transmitting the message from the first VMS platform to the second VMS platform when the VMS platforms service different service regions and when inter-service region messaging is enabled for the sender.

14. The method of claim 13, further comprising generating a call detail record for transmitting the message from the first VMS platform to the second VMS platform when the VMS platforms service different service regions.

15. The method of claim 13, further comprising:
    transmitting all intra-service region messages within a predetermined time period from a sender in exchange for a periodic subscription fee; and
    charging the sender a predetermined fee for each inter-service region message.

* * * * *